United States Patent
Allemand et al.

(10) Patent No.: US 11,096,522 B2
(45) Date of Patent: Aug. 24, 2021

(54) HOUSEHOLD ELECTRICAL AIR FLOW COOKING APPLIANCE

(71) Applicant: SEB S.A., Ecully (FR)

(72) Inventors: Bernard Allemand, Velesmes Echevanne (FR); Johann Petitallot, Arceau (FR)

(73) Assignee: SEB S.A.

( * ) Notice: Subject to any disclaimer, the term of this patent is extended or adjusted under 35 U.S.C. 154(b) by 61 days.

(21) Appl. No.: 14/431,106

(22) PCT Filed: Sep. 18, 2013

(86) PCT No.: PCT/FR2013/052150
§ 371 (c)(1),
(2) Date: Aug. 12, 2015

(87) PCT Pub. No.: WO2014/049231
PCT Pub. Date: Apr. 3, 2014

(65) Prior Publication Data
US 2016/0270596 A1    Sep. 22, 2016

(30) Foreign Application Priority Data

Sep. 26, 2012   (FR) ...................................... 1259069

(51) Int. Cl.
*A47J 39/00*   (2006.01)
*A47J 37/06*   (2006.01)
*A47J 37/12*   (2006.01)

(52) U.S. Cl.
CPC ......... *A47J 39/003* (2013.01); *A47J 37/0641* (2013.01); *A47J 37/1209* (2013.01)

(58) Field of Classification Search
CPC ...... A47J 39/003; A47J 27/004; A47J 37/047; A47J 37/043; A47J 37/0623;
(Continued)

(56) References Cited

U.S. PATENT DOCUMENTS

| 2,024,062 A | 12/1935 | Preedit |
| 2008/0163764 A1* | 7/2008 | Payen ................... A47J 37/043 99/447 |

(Continued)

FOREIGN PATENT DOCUMENTS

| EP | 2248452 A1 | 11/2010 |
| FR | 2945200 B1 * | 2/2016 ............ A47J 36/165 |

(Continued)

OTHER PUBLICATIONS

Machine translation of FR 2945200 performed on Jul. 2, 2020.*

*Primary Examiner* — Tu B Hoang
*Assistant Examiner* — Alba T Rosario-Aponte
(74) *Attorney, Agent, or Firm* — Lerner, David, Littenberg, Krumholz & Mentlik, LLP

(57) ABSTRACT

Provided is a household electrical appliance for cooking and/or reheating food including: a housing having a tank arranged such as to receive the food to be cooked and/or reheated; a removable cover arranged such as to close the tank while cooking and/or reheating; at least one heating element and a fan arranged such as to create a closed hot air flow while cooking and/or reheating; and a ventilation sheath that includes a suction inlet, arranged on one side of the tank, and a ventilation outlet above the tank. Said ventilation sheath is arranged such as to direct the hot air flow onto the food while cooking and/or reheating. Said appliance is characterized in that the ventilation sheath is in one piece and separated from the cover.

10 Claims, 1 Drawing Sheet

(58) Field of Classification Search
CPC ............... A47J 37/0641; A47J 37/1266; A47J 37/1261; A47J 37/1257; A47J 37/1209; A47J 36/165; F24C 15/325
USPC ............... 99/409, 339, 337, 338, 403, 348; 219/400, 385, 439, 533; 426/438, 523, 426/519
See application file for complete search history.

(56) References Cited

U.S. PATENT DOCUMENTS

2010/0303986 A1* 12/2010 De' Longhi ........ A47J 37/1209
426/438
2011/0185917 A1* 8/2011 Goderiaux ............ A47J 36/165
99/348

FOREIGN PATENT DOCUMENTS

WO         87/00261 A1    1/1987
WO      2006/000700 A2    1/2006

* cited by examiner

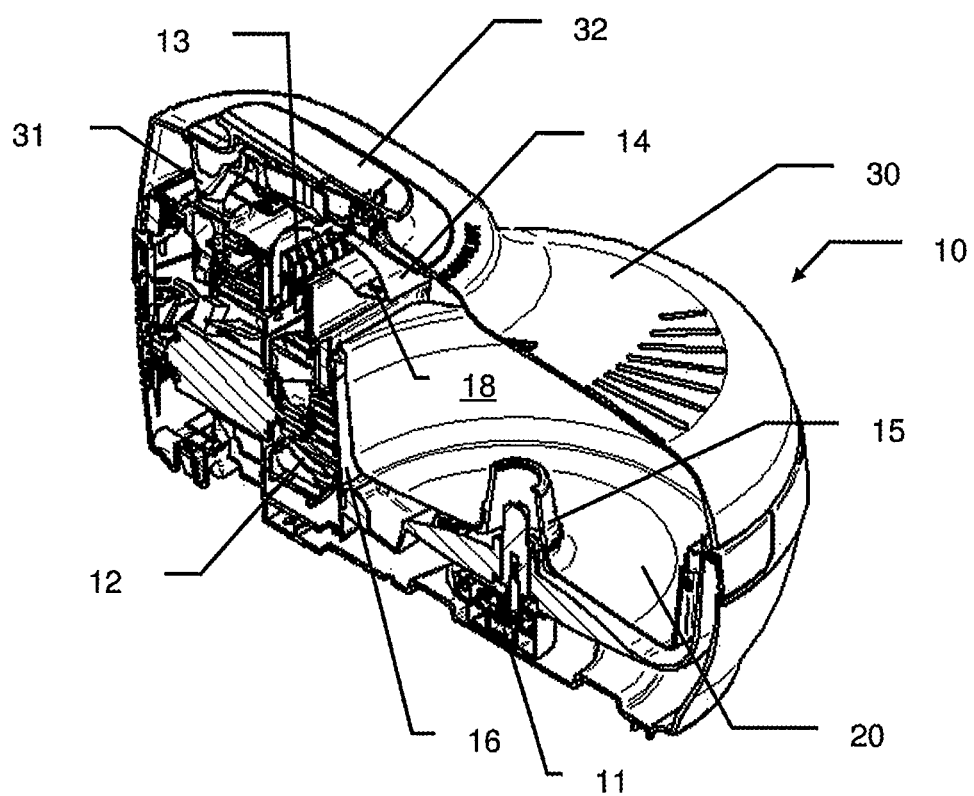

HOUSEHOLD ELECTRICAL AIR FLOW COOKING APPLIANCE

CROSS-REFERENCE TO RELATED APPLICATIONS

This application is the United States national phase of International Application No. PCT/FR2013/052150 filed Sep. 18, 2013, and claims priority to French Patent Application No. 1259069 filed Sep. 26, 2012, the disclosures of which are hereby incorporated in their entirety by reference.

BACKGROUND OF THE INVENTION

Field of the Invention

The present invention relates in a general manner to an air flow cooking appliance, and in particular to the ventilation circuit formed in such an appliance.

Description of Related Art

Air flow cooking appliances such as the one described in document WO 2006/000700 A2 are known to the prior art. The appliance described therein comprises heating resistors and a fan for creating a closed (recirculating) hot air flow directed to food contained in a tank. The air is suctioned at one side wall of the tank by the fan and circulates in a pipe of the cover such as to be expelled via a ventilation outlet toward the food in the tank. However, this system in particular has the disadvantage of having a complicated cover that partially forms this ventilation sheath. Indeed, it is necessary to add baffles to the cover in order to form this ventilation sheath and to arrange for the adjustment thereof to the other part of the sheath arranged on the fix-mounted housing. Manufacturing tolerances need to take this adjustment function into account, which not only impacts the costs but also the assembly procedure (which is prolonged).

An object of the present invention is to address the disadvantages of the above-mentioned prior art document and in particular, firstly to propose an air flow cooking appliance that is simple and economical to manufacture.

SUMMARY OF THE INVENTION

To this end, a first aspect of the invention relates to a household electrical appliance for cooking and/or reheating food, comprising:

a housing with a tank arranged such as to receive the food to be cooked and/or reheated, a removable cover arranged such as to close the tank while cooking and/or reheating, at least one heating element and a fan arranged such as to create a closed hot air flow while cooking and/or reheating, a ventilation sheath comprising a suction inlet arranged on one side of the tank, a ventilation outlet above the tank and arranged such as to direct the hot air flow onto the food while cooking and/or reheating, characterized in that the ventilation sheath is in one piece and separated from the cover.

The appliance of the present invention proposes a simple cover in which the ventilation sheath is not integrated, and because the ventilation sheath is separated from the cover, there is no interaction between the cover and the ventilation sheath and manufacturing tolerances are therefore not dictated by these factors. It should be noted that a closed circuit for such an appliance means that the majority of the air flow is recirculated, but that air leaks between the cover and the housing are possible.

According to an embodiment, the cover comprises a handle arranged on an upper portion of the cover opposite the ventilation sheath, and the cover has a double wall on the upper portion on which the handle is arranged. With this implementation of the invention, the user is well-protected from burn hazards by the double wall, which insulates the handle from the heat radiated onto the cover by the ventilation sheath.

According to an embodiment, the ventilation outlet forms an outlet surface oriented at an angle between 10° and 80° with the horizontal. With the ventilation outlet oriented downwards the air flow is directed directly onto the food, without losses or pointless turbulence.

According to an embodiment, the appliance comprises a wall surrounding the tank and arranged at a predefined distance from the tank in order to allow the air flow projected onto the food to advance toward the suction inlet of the ventilation sheath.

According to an embodiment, said at least one heating element is arranged in the ventilation sheath downstream of the fan. This implementation gives rise to a ventilation sheath-heating element sub-assembly that can optionally be supplied to the main assembly line in fully assembled form.

According to an embodiment, the fan is a centrifugal fan that comprises an impeller arranged laterally to the tank, and the ventilation sheath is arranged above the impeller.

According to an embodiment, the ventilation sheath is metal.

According to an embodiment, the appliance comprises a stirring means for automatically coating said food with a film of fat by stirring said food together with fat.

According to an embodiment, the stirring means comprises at least one blade arranged in the tank and turning about an axis of rotation.

According to an embodiment, the appliance forms a dry fryer.

An aspect of the invention relates to a household electrical appliance for cooking food, comprising:

a housing with a container arranged such as to receive the food to be cooked, a removable cover arranged such as to close the container while cooking, at least one safety switch arranged in the housing such as to turn at least one electrical circuit of the appliance off when the cover is not closing the tank, and to turn said at least one electrical circuit on when the cover is closing the tank, a cam arranged in the housing and having at least one control surface arranged such as to actuate a key for controlling said at least one safety switch in a direction in which the control key is pressed, characterized in that the cover comprises a control finger arranged such as to actuate a surface for inputting the cam in a direction for moving the input surface that is different from the direction of pressing:

in order to turn said at least one electrical circuit off while the container is open, in order to turn said at least one electrical circuit on while the container is closed.

The appliance of the present invention ensures safe use with the circuit turned off when the cover is not closing the container, and because the cam of the housing is actuated by the control finger in order to turn the electrical circuit off/on, it is not necessary to install a portion of the electrical circuit on the cover. In other words, the cover only comprises the mechanical control element (the finger) for actuating the electrical circuit of the housing, which is separate from the cover. Moreover, the present invention makes it possible to use simplified safety switches because the control key is subjected to a mechanical load in the direction in which it is pressed. There is no need to provide switches designed to resist forces exerted on the control key in a direction other than the one in which it is pressed. Such a switch (one capable of withstanding an actuation force exerted at a 45° angle to the pressing direction, for example) is more expensive than the kind of switch required by the invention (one in which the actuation force is parallel to the direction in which the key is pressed). Furthermore, with a direction for moving the input surface that differs from the direction in which the control key is pressed, the designer of the appliance has more freedom in terms of installing the switch, as the latter is no longer linked to the direction for moving the input surface.

According to an aspect of the invention, the control finger is arranged such as to be inserted in and withdrawn from the appliance during the closing and opening, respectively, of the container in a direction of insertion and withdrawal that is perpendicular to the direction for moving the input surface. On its input surface, the cam bears the force exerted by the finger in a direction different from the one in which the input surface is moved.

According to an aspect of the invention, the control finger has a predefined thickness and the movement of the surface for inputting the cam in the direction for moving the input surface in order to turn the electrical circuit on or off is equal to the predefined thickness of the control finger. The travel path of the surface for inputting the cam defines the travel path of the control surface and therefore the control of the switch. According to this embodiment, these travel paths are defined by the thickness of the control finger and consequently the precision of the travel path depends solely on the thickness of the finger, thus making it easier to control for variability during series production.

According to an aspect of the invention, the appliance has a fix-mounted guide stop arranged such that the control finger slides between the surface for inputting the cam and the fix-mounted guide stop as it is inserted into and withdrawn from the appliance. Better guidance is thus achieved, and the fix-mounted guide stop absorbs the forces exerted on the finger by the cam such that the structure of the finger can be simplified.

According to an aspect of the invention, the electrical circuit has a phase and a neutral, the appliance comprises a safety switch for the phase and a safety switch for the neutral, and the cam comprises a separate control surface for each safety switch. This implementation ensures the safety of the phase circuit and of the neutral circuit and offers the option of offsetting the two switches relative to one another.

According to an aspect of the invention, the appliance comprises an axis of rotation, the cam is arranged such as to pivot about the axis of rotation, and the safety switches and the respective control surfaces of the cam are angularly offset and arranged in a common plane. This implementation improves the compactness of the appliance.

According to an aspect of the invention, the appliance comprises an elastic element arranged such as to exert a constant force on the cam, which tends to turn off said at least one electrical circuit. The return of the cam to the position for turning the electrical circuit off ensures safe use by systematically restoring the cam to the position for turning the electrical circuit off. In an advantageous manner, the safety switch or switches itself (themselves) comprise(s) this elastic element, which ensures a return to the off-position of the electrical circuit.

According to an aspect of the invention, the electrical circuit is a heating circuit and/or a circuit for supplying power to a motor for driving in rotation a rotary tool arranged in the container.

BRIEF DESCRIPTION OF THE DRAWING

Other features and advantages of the present invention will emerge more clearly upon reading the following detailed description of an embodiment of the invention, which is given as an example that is not limiting in any way and which is illustrated by the appended drawing, wherein:

The drawing shows a cutaway perspective view of an appliance of the present invention.

DETAILED DESCRIPTION OF THE INVENTION

According to the invention, the appliance is a household appliance, i.e., one specifically designed and dimensioned for household use, in a family setting for example. To this end, the appliance can be manually manipulated by the user thereof, for example in order to move it from a cupboard to a work surface. In other words, preference is given to the appliance being portable.

The appliance of the invention is preferably designed and dimensioned for cooking and/or heating certain foods such as potato chunks.

The overall design of the appliance of the invention allows considerable versatility in terms of cooking methods such that the term "cooking" used herein covers different methods of preparing food such as frying, browning, roasting, or searing.

In a preferred alternative embodiment, which corresponds to the examples illustrated in the figures [sic], the appliance of the invention is preferably designed and dimensioned for heat treating food in such a way as to confer the latter with gustatory qualities essentially equivalent or close to those of fried food, and specifically food fried in an oil bath. In this alternative embodiment, the appliance of the invention therefore constitutes a fryer, and more particularly a dry fryer. Here dry frying is used to designate a method of cooking food without immersion (whether partial and/or temporary) of the latter in a bath of oil or fat during the cooking cycle.

Rather, the expression dry frying designates cooking in which the food is admittedly moistened by a cooking medium (for example oil), but without being immersed or soaking in said medium. In this respect the operating principle of the fryer according to the invention differs from that of a standard oil bath fryer, particularly in that it allows the creation of conditions for establishing a Maillard reaction sufficient for conferring the golden, crispy texture of fried foods to the food without said food having been completely and directly immersed in a bath of burning oil.

The drawing shows an appliance for cooking and/or reheating food according to the present invention, which has a housing 10 and a cover 30.

The housing 10 holds a tank 20, which is mounted and arranged such as to receive the food to be cooked and/or reheated, in which is arranged a stirring means 15 such as a blade turning about an axis of rotation and driven in rotation by a motor 11 for stirring the food and coating it with a layer of fat.

For heating and/or cooking the food put in the tank 20, the housing 10 further comprises a fan and a heating element 13 formed, for example, by a resistor and arranged such as to create a closed hot air flow that will be directed onto the food in the tank 20 for cooking and/or reheating said food. The ventilation circuit comprises an impeller 12 of the fan, which is arranged such as to suction air located around the tank 20 through a grill 16 and convey it to the heating resistor 13, which is arranged in a ventilation sheath 14. The latter has a ventilation outlet 18 above the tank 20, which is oriented downwards in order to direct the expelled air flow to the food contained in the tank 20.

The cover 30 is detachable from the housing 10, meaning that it can be removed completely from the latter in order to put food in the container or to remove it therefrom. For the sake of ergonomics, the cover 30 comprises a handle 32 for easy manipulation. Furthermore, provision is made of a control finger 31 on the cover for actuating at least one safety switch of the housing during the opening and closing for turning an electrical circuit of the appliance off and on, respectively. Lastly, a double wall is formed on the cover 30 at the place where the handle 32 is fastened. Indeed, the ventilation sheath 14 faces the place where the handle 32 is fastened onto the cover, and the double wall prevents the heat radiated by the ventilation sheath 14 onto the inside face of the cover 30 from being conducted to the handle 32. The user is thus protected from being burned, even if he grasps the handle 32 during cooking.

The ventilation outlet 18 arranged above the tank 20 is oriented downwards in order to direct the hot air flow directly onto the food contained in the tank 20. The outlet 18 forms a surface that is oriented at an angle between 10° and 80° relative to a horizontal plane. Near the lower bound of this range, the angle of the outlet 18 will result in a jet descending directly onto the part of the tank 20 located under the outlet 18, whereas near the upper bound of the aforementioned range, the angle of the outlet 18 will define a hot air flow that will bathe the part of the tank opposite the outlet 18 in relation to the center of the tank 20.

The fan and its impeller 12 are fastened onto an element of the housing 10, and the ventilation sheath 14 is likewise mounted on the element of the housing in order to collect the air suctioned and expelled upwards by the impeller 12. The assembly is simple.

The ventilation sheath 14 is separated from the cover 30, and the latter does not have any air channeling element, thus simplifying the design of the cover. Furthermore, the ventilation sheath 14 configured separately from the cover 30 fastens only onto the housing 10, thus offering the option of manufacturing a separate sub-assembly composed of the ventilation sheath 14 and the heating resistors 13, wherein this sub-assembly can be manufactured apart from and supplied directly to the final assembly line for the appliance of the invention.

Lastly, the ventilation sheath 14 is arranged such as not to interfere with the manipulation of the cooking tank 20. In other words, the ventilation sheath 14 is dimensioned for positioning the tank 20 in the appliance or removing it therefrom by tilting it slightly.

It should be understood that diverse modifications and/or improvements obvious to persons skilled in the art can be made to the different embodiments of the invention described in this description without exceeding the scope of the invention defined by the appended claims.

The invention claimed is:

1. A household electrical appliance for cooking and/or reheating food, comprising
    a housing with a tank arranged to receive food to be cooked and/or reheated,
    a removable cover arranged to close the tank while cooking and/or reheating,
    at least one heating element and a fan arranged to create a closed hot air flow while cooking and/or reheating,
    a ventilation sheath comprising a suction inlet arranged on one side of the tank, a ventilation outlet above the tank and arranged downwards to direct the hot air flow directly onto the food while cooking and/or reheating when the tank is closed by the cover, wherein the ventilation sheath is in one piece and separated from the cover,
    wherein the ventilation sheath is directly fastened only onto the housing of the tank and not integrated in the cover so that the cover does not have any air channeling element that channels heated air flow onto the food in the tank.

2. The appliance as in claim 1, wherein the cover comprises a handle arranged on an upper portion of the cover, opposite the ventilation sheath, and wherein the cover has a double wall on the upper portion on which the handle is arranged.

3. The appliance as in claim 1, wherein the ventilation outlet forms an outlet surface oriented at an angle between 10° and 80° with the horizontal.

4. The appliance as in claim 1, further comprising a wall surrounding the tank and arranged at a predefined distance from the tank for allowing the air flow projected onto the food to advance towards the suction inlet of the ventilation sheath.

5. The appliance as in claim 1, wherein said at least one heating element is arranged in the ventilation sheath, downstream of the fan.

6. The appliance as in claim 1, wherein the fan is a centrifugal fan which comprises an impeller arranged laterally to the tank, and wherein the ventilation sheath is arranged above the impeller.

7. The appliance as in claim 1, wherein the ventilation sheath is metal.

8. The appliance as in claim 1, comprising a stirring means for automatically coating said food with a film of fat by stirring said food together with fat.

9. The appliance as in claim 8, wherein the stirring means comprises at least one blade arranged in the tank and turning about an axis of rotation.

10. The appliance as in claim 1, in the form of a dry fryer.

* * * * *